J. H. VAN ARSDALE.
VEHICLE WHEEL.
APPLICATION FILED JAN. 15, 1909.
934,773.
Patented Sept. 21, 1909.
2 SHEETS—SHEET 1.
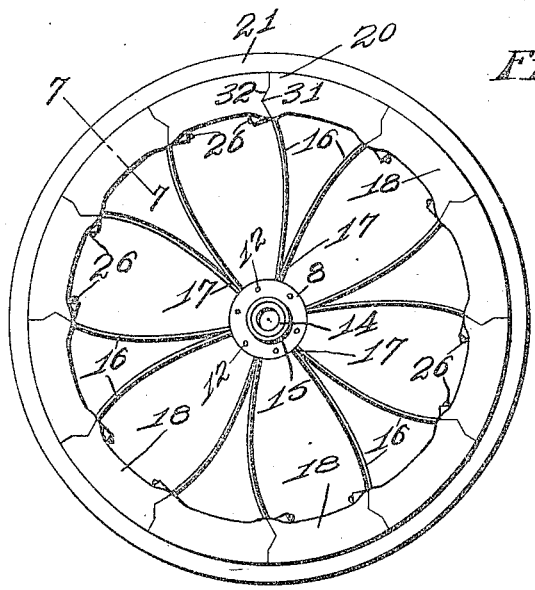
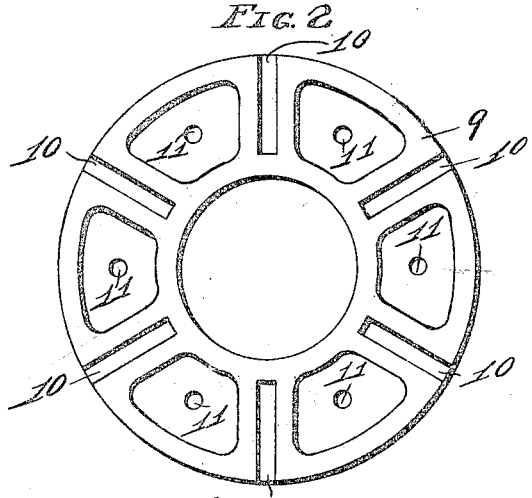
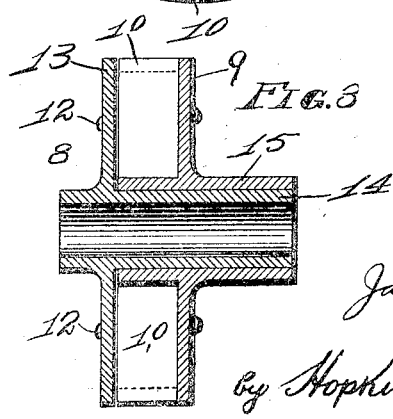
Witnesses
Inventor
James H. Van Arsdale
by Hopkins & Eicks Attys J. H. VAN ARSDALE.
VEHICLE WHEEL.
APPLICATION FILED JAN. 15, 1909.
934,773.
Patented Sept. 21, 1909.
2 SHEETS—SHEET 2.
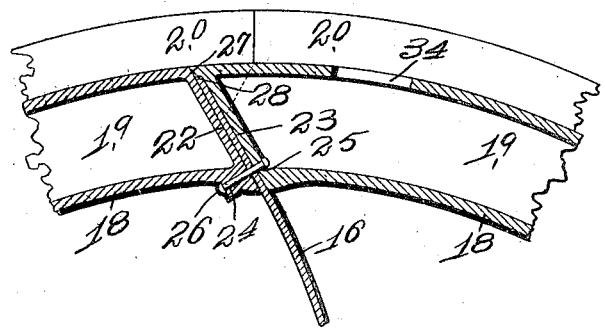
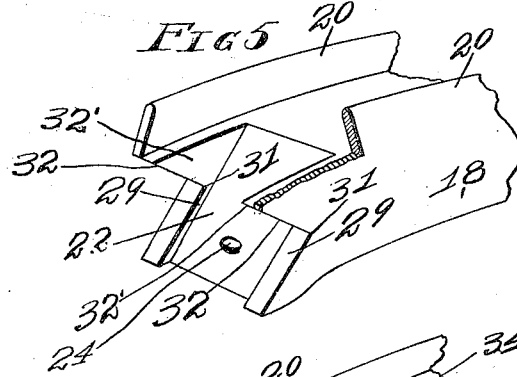
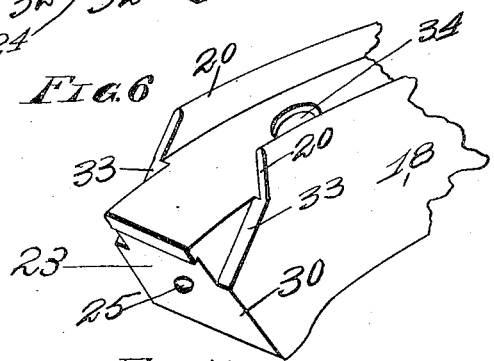
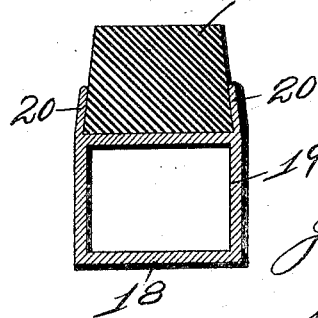
Witnesses
H. C. Stein
L. A. L. McIntyre
Inventor
James H. Van Arsdale
By Hopkins & Eicks Attys.

UNITED STATES PATENT OFFICE.

JAMES H. VAN ARSDALE, OF ST. LOUIS, MISSOURI, ASSIGNOR OF ONE-HALF TO HENRY LUEDINGHAUS, JR., OF ST. LOUIS, MISSOURI.

VEHICLE-WHEEL.

934,773.

Specification of Letters Patent. Patented Sept. 21, 1909.

Application filed January 15, 1909. Serial No. 472,552.

*To all whom it may concern:*

Be it known that I, JAMES H. VAN ARSDALE, a citizen of the United States, and resident of St. Louis, Missouri, have invented certain new and useful Improvements in Vehicle-Wheels, of which the following is a specification.

My invention relates to improvements in vehicle wheels and has for its object to provide a wheel having resilient spokes, a sectional hub and a sectional felly; the felly being formed in segments; the meeting ends of each pair of segments serving as a pocket for the reception of the outer end of the spoke.

In the drawings—Figure 1 is a side elevation of a wheel embodying my invention. Fig. 2 is a plan view of the base of the hub employed in my invention. Fig. 3 is a transverse vertical view in mid section of the hub employed in my invention. Fig. 4 is a transverse vertical view in section of the meeting ends of two of the segments employed in the construction of the felly. Fig. 5 is an enlarged perspective view of the ends of one of the female segments of which the felly is constructed. Fig. 6 is a similar view of one of the male sections of my invention. Fig. 7 is a transverse sectional view of the felly and tire taken along the line 7—7 of Fig. 1.

As shown in the drawings, I employ a hub 8 consisting of a base section 9 containing the pockets 10; the section 9 being perforated as indicated by the numeral 11 to admit the bolts 12 used in securing the cap section 13 in place upon the base section 9. The axle box 14 is made integral with the cap section 13 and the base section 9 is elongated and provided with a cylindrical core 15 which is adapted to fit over the axle box 14.

The spokes 16 are made of any resilient material and are grouped in pairs as illustrated in Fig. 1, the base of each pair being adapted to fit within one of the pockets 10 in the hub 8, while from the point indicated in Fig. 1 by the numeral 17, said spokes diverge in V-shape.

The felly employed in my invention is constructed of a plurality of segments 18, each of which segments is constructed with a hollow square base 19 and converging outwardly extending jaws 20, within which jaws the tire 21 is seated (see Fig. 7); the segments 18 are formed as illustrated in Figs. 5 and 6, the segment shown in Fig. 5 having been heretofore referred to as the female segment. Each end of said segment is provided with a mortise 22 which forms the end wall of the hollow interior of said segment (see Fig. 4).

The male segments illustrated in Fig. 6 are provided at each end with a beveled tenon 23 which corresponds in angle to the bevels 22 in the female segments, and the face thereof constitutes one of the end walls of the hollow interior of the segment. The mortise 22 is provided with the perforation 24 and the tenon 23 is provided with the perforation 25 to admit the bolt 26. At the upper edge of the face of the tenon 23 a shoulder 27 is provided which is adapted to contact with the outer edge of the adjacent female segment, so that the space between the two segments forms a pocket 28 adapted to receive the end of one of the spokes 16; the end of said spoke is provided with a perforation through which the bolt 26 passes.

The side walls of the various segments are cut away in the manner illustrated in Figs. 5 and 6; the female segment, as illustrated in Fig. 5, being provided with outwardly projecting walls 29, while in the male segments the corresponding lower half of the side walls at each side of the tenon 23 is flush with the face of the mortise as illustrated by the numeral 30; the extensions 29 on either side of the tenon 22 form the side walls of the pockets 28, and thus prevent any lateral movement of the spokes 16 when mounted therein, as well as any lateral movement of the felly sections.

Above the point indicated by the numeral 31 in Fig. 5, the side walls of the female segments project outwardly as indicated by the numeral 32, the wall sections 32′ thus formed serving as side supports for the upper portions of the tenons 23, the male segments, as illustrated in Fig. 6, having their side walls cut away as indicated by the numeral 33 to receive said wall sections 32′.

By means of the construction which I have thus described, I have provided a sectional vehicle wheel which may be provided with tires either of rubber or other material; the spokes being resilient; the hub sectional and readily taken apart, and the felly comprised of sections which are rigidly secured together when in use, are readily taken apart for the purpose of replacement or repair. Furthermore, the wheel as a whole may be readily knocked down within compact compass for purposes of transportation or storage.

Each of the male segments illustrated in Fig. 6 is provided with an opening 34 in its outer wall which permits the bolt 26 to be inserted in place.

Having thus fully described my invention, what I claim as new and desire to have secured to me by the grant of Letters Patent is:

1. A vehicle wheel comprising a felly composed of opposing male and female segments, the abutting ends of said segments being mortised and tenoned and provided with pockets; a plurality of spring spokes radiating from a center; the outer ends supported in the pockets of the felly, said spokes arranged back to back and a hub for supporting the inner ends of the spokes, substantially as specified.

2. A vehicle wheel comprising a felly composed of a plurality of segments, their ends being mortised and tenoned and when connected forming pockets, each of said segments having radially projecting flanges in which the tire is held; a hub; a plurality of spokes radiating from said hub, the outer ends thereof supported in the pockets formed by the abutting segments, said spokes arranged in pairs and located back to back, their ends supported in slots formed in the hub, each of said segments provided with an opening through which a rivet or bolt is passed so as to retain the same, together with the spoke, in rigid position, substantially as specified.

In testimony whereof, I have signed my name to this specification, in presence of two subscribing witnesses.

JAMES H. VAN ARSDALE.

Witnesses:
WALTER C. STEIN,
JAMES L. HOPKINS.